May 21, 1968  E. D. SPERRY III  3,384,751
BEAM PORT CLOSURE FOR NUCLEAR REACTOR
Filed May 12, 1965  2 Sheets-Sheet 1

INVENTOR.
EDWARD D. SPERRY, III
BY

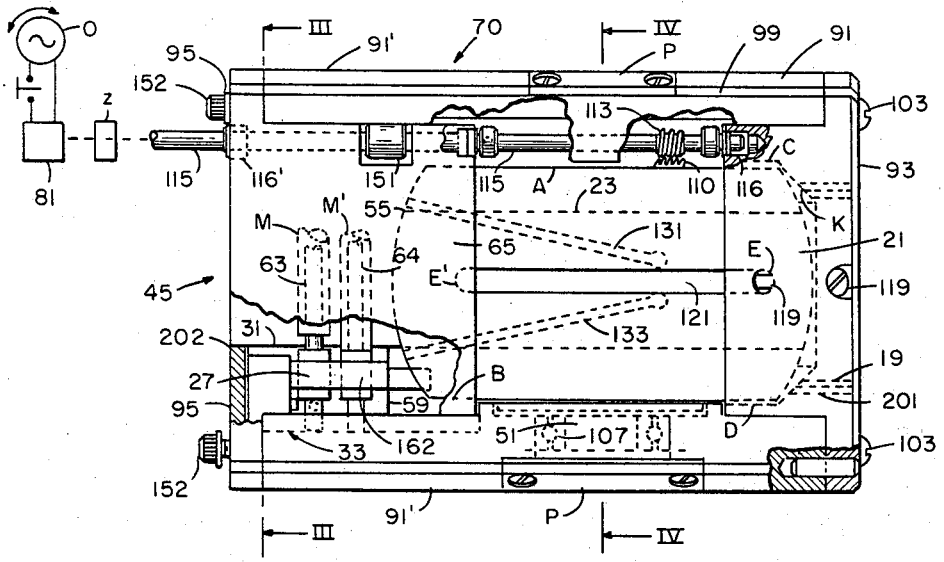
Fig. 2
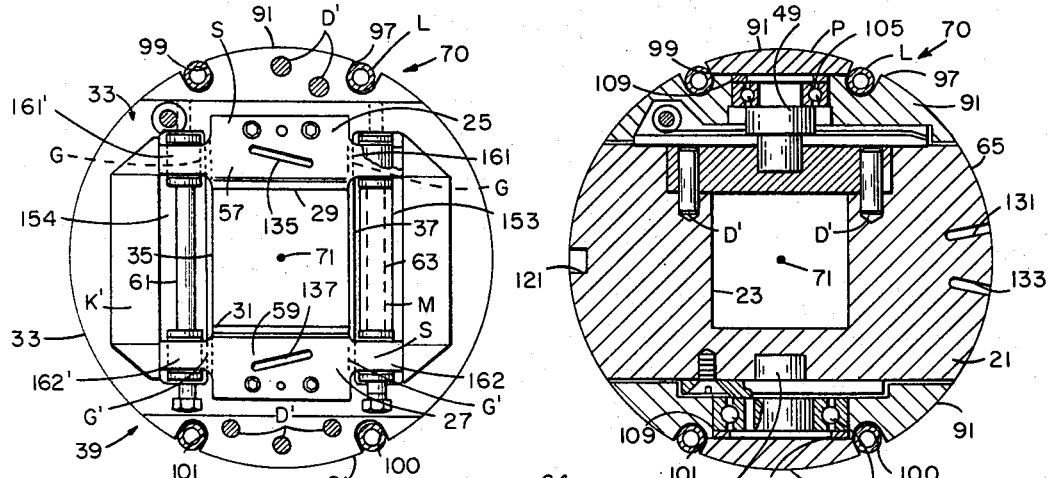
Fig. 3
Fig. 4
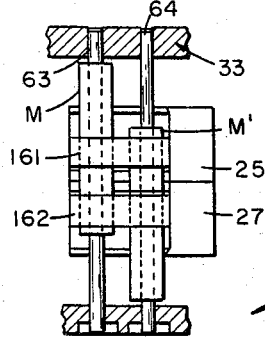
Fig. 5
INVENTOR.
EDWARD D. SPERRY, III

3,384,751
BEAM PORT CLOSURE FOR NUCLEAR REACTOR
Edward D. Sperry III, Ridge, N.Y., assignor to the United States of America as represented by the United States Atomic Energy Commission
Filed May 12, 1965, Ser. No. 455,351
2 Claims. (Cl. 250—105)

ABSTRACT OF THE DISCLOSURE

A beam port closure for a high flux, high energy particle beam from a nuclear reactor, having a compact, portable, easily rotatable, pierced ball and oppositely slidable shutters that move selectively to provide a uniform, substantially unperturbed, neutron path when open and maximum shielding when closed.

---

This invention relates to nuclear reactors and more particularly to beam-port closures for high flux beam nuclear reactors.

In high flux beam nuclear reactors a need exists for a beam-port closure. The beams from these reactors have a high particle density from $10^{14}$ to $10^{15}$ neutrons/cm.²/ sec. above 300 kilovolts energy and are of interest especially in particular unperturbed, narrow, high energy bands, for example, from .302 mev. to 10 mev. Swinging door shutters, guillotines and rotary apertured cylinders for these beam-port closures do not operate properly at such high flux and energy levels because they don't provide sufficient particle blockage when closed or provide too much perturbation or insufficient beam area when open. Others, such as those having blocks that are inserted for beam blockage have highly frictional components, permit line of sight leakage paths and/or require manipulators that are too costly, bulky, complicated or hard to operate for routine work. It is additionally advantageous to provide a small packaged unit that can easily be inserted and removed remotely from the confined space provided by existing beam tubes having water, air and vacuum supply lines and fixed collimating means, and that operate dependably with a simple, small rotary, remote power source.

It is an object of this invention to provide an economical and practical apparatus and method for selectively opening and closing a high energy, high flux neutron beam reactor port having a confined cross-section by providing in the port a mechanism having a rotatable pierced ball and oppositely slidable solid shutters that move to provide a uniform substantially unperturbed, maximum cross-section particle path when open and maximum shielding in the desired position substantially without in-line-voids seriatim across the whole port cross-section when closed;

It is a further object to provide a beam port closure means that collimates a high energy, high flux beam substantially without perturbations when the closure is open;

It is a further object to provide a beam port collimating means that closes to block a high flux neutron beam in such a way as substantially to avoid introducing line-of-sight openings or in-line voids seriatim;

It is a further object to provide a beam port closure providing for a maximum beam port opening in a confined beam port tube;

It is a further object to provide means for rotating a pierced rotatable ball simultaneously oppositely to slide adjacent shutters relative to a particle beam path so as selectively to maximize the beam port opening in an open position and selectively to maximize shielding in a closed position.

It is a further object to provide a compact portable beam port closure for use in conventional beam ports for high flux beam reactors;

It is a further object to provide a low friction particle beam port closure that is easily operable with a low torque rotatable remote power source.

According to this invention, the foregoing objects are achieved by rotating a pierced ball in the beam path selectively to pass and block the beam as the ball passage rotates into and out of alignment with the beam axis and opening and closing shutters that are axially moveable at right angles to the beam axis and adjacent to and in correspondence with the ball rotation selectively to pass and block the beam. More particularly, in one embodiment, this invention provides a portable beam port closure for high flux beam reactor ports, comprising a rotatable ball having a passage therethrough corresponding in cross-section with the beam cross-section, shutters that move axially at right angles to the beam axis adjacent to said ball, and means for rotating the ball to align the ball passage with the beam axis and oppositely to separate the shutters to provide a uniform substantially unperturbed particle path for the beam and for rotating the ball passage out of alignment with the beam axis and oppositely to close the shutters to provide small, staggered, unaligned voids for maximum shielding when the ball passage is at right angles to the beam and port axis. With the proper selection and arrangement of parts, as described in more detail hereinafter, the desired selective beam port blockage and collimation are provided in a portable unit with a simple remote, rotary driving power source that rotates the ball to move the shutters seriatim.

The above and further novel features and objects of this invention will appear more fully from the following detailed description when the same is read in connection with the accompanying drawings of one embodiment of this invention. It is to be expressly understood, however, that the drawings are not intended to be a definition of the invention, but are for the purpose of illustration only.

In the drawings where like parts are marked alike:

FIG. 2 is a partial cross-section through a working embodiment of the beam-port closure of this invention incorporating the principles of FIGS. 1;

FIG. 3 is a partial cross-section of the apparatus of FIG. 2 through III—III;

FIG. 4 is a partial cross-section of the apparatus of FIG. 2 through IV—IV;

FIG. 5 is a partial side view of guide elements of one side of FIG. 3.

Figure 1:
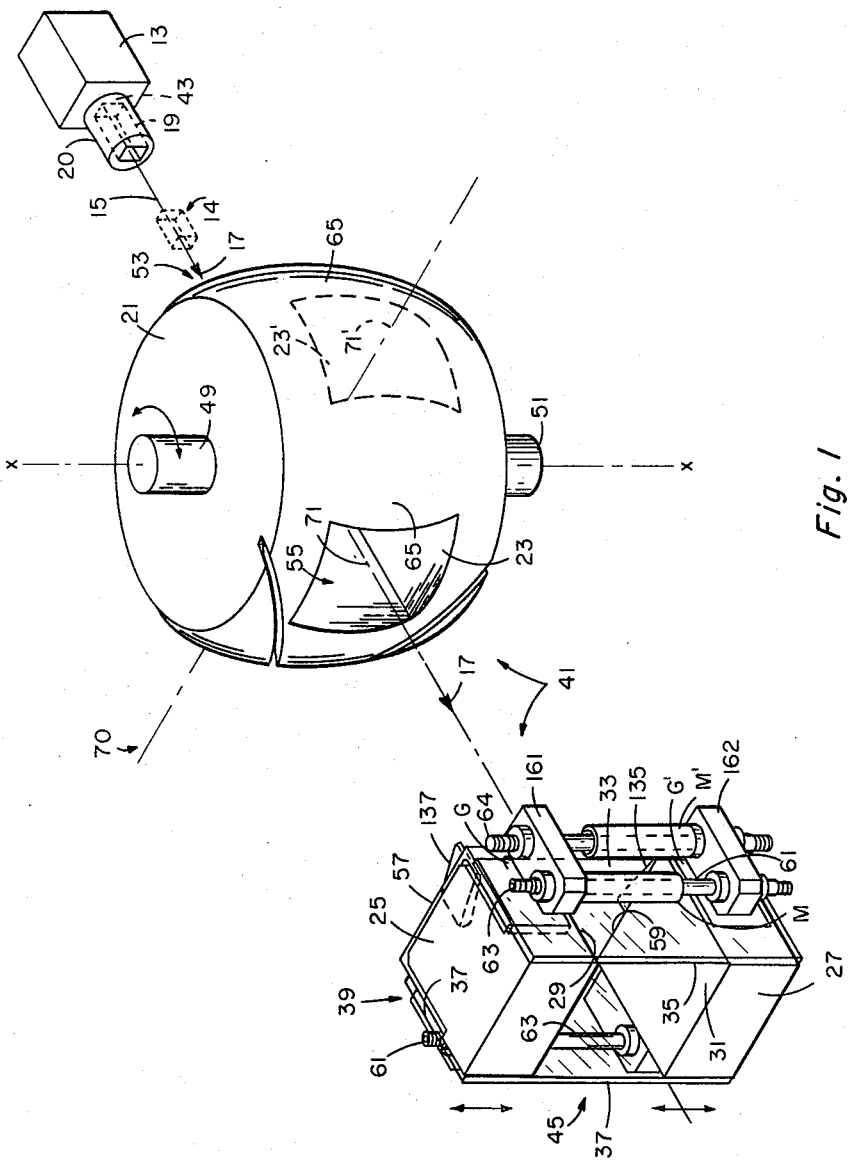
FIG. 1 is a partial three dimentional diagrammatic illustration of the principles involved in this invention.

The beam port closure of this invention is useful for the high flux, high energy neutron beams (up to over 10 mev.) provided by the high flux beam reactor at the Brookhaven National Laboratory. These beam sources are described and shown in U.S. Patent 3,143,478, entitled "High Flux Beam Reactor," by Chernick et al., assigned to assignee of this invention. The beam port closure of this invention is particularly adapted for use with high energy cylindrical beam tubes shown in FIG. 2 of the above-referenced patent which are confined cylindrical ports accommodating water, air and vacuum supply lines and fixed collimating means. The principles of this invention are useful, however, in selectively collimating and blocking any particle beam requiring maximum shielding when closed and maximum beam diameter and collimation, i.e., minimum beam perturbation, when open.

In order to explain how the method and apparatus of this invention selectively collimate and block the beam in the beam ports of the abovementioned high flux beam reactor source, reference is made to FIG. 1, wherein the source is represented schematically as source 13 for producing beams having high density high energy particles around a central axis. For convenience, one beam 14 is partially illustrated having particles moving along an axis 15 in a direction indicated by arrow 17. Each beam from the source 13 has a collimator 19 inserted in a fixed cylindrical beam tube, illustrated as tube 20, that passes through the reactor source wall to transport the high density, high energy beam 14 from the core (not shown) of the reactor source 13. The collimator 19 has an open-ended, inner parallelepiped shape and square (or rectangular) cross-section around axis 15, so that the collimator 19 receives, collimates and transmits the neutrons in the beam 14 along the axis 15 in direction 17. The beam has a maximum cross-sectional area corresponding to the inside area of the collimator consistent with the insertion of the collimator 19 in the beam tube 20. The location and direction of the beam tube 20 relative to the reactor core and reflector (not shown) determines the band of neutron energies in the beam. For purposes of illustration, the beam 14 has a particle density of $10^{14}$ to $10^{15}$ neutrons/cm.$^2$/sec. in a narrow energy band of from .302 mev. to 10 mev,. as is well understood in the art.

To collimate the beam 14 substantially without perturbing the path of the particles therein, ball 21 has an aperture 23 whose inside shape and direction exactly correspond with the shape and direction of the inside of collimator 19. Also, shutters 25 and 27 forming parallel surfaces 29 and 31 are arranged in a box 33 (shown in phantom for ease of explanation) having two parallel sides 35 and 37 to form a four sided, open-ended collimator assembly 39 whose shape and direction exactly correspond with the inside shape and direction of aperture 23 and collimator 19. Additionally, the collimator 19, ball 21 and assembly 39 are adjacent each other in line with each other and with very small clearances therebetween to form a substantially uninterrupted or continuous channel or collimator 41 from the entrance end 43 of the beam tube 20 to the exit end 45 of the shutter assembly 39.

Opposite spindle shafts 49 and 51 at right angles to the beam axis 15 hold the entrance end 53 of aperture 23 closely adjacent the collimator 19 transmitting the beam 14 thereto and hold the exit end 55 of aperture 23 closely adjacent the ends 57 and 59 of shutters 25 and 27 while shutter guides 61, 63 and 64 hold the shutter ends 57 and 59 parallel to each other, at right angles to the beam axis and closely adjacent the outside surface 65, of ball 21 at the exit end 55 of aperture 23. Thus the beam port closure 70 of this invention provides a smooth, substantially continuous collimator 41 when open that substantially does not perturb the beam particle paths whereby the spectral purity of the beam energy and density are preserved in passing through beam port 20 and collimator 41 when closure 70 is open. Moreover, the closure 70 provides a substantially solid cross-section to all particles that do not pass through the opening of collimator 41 provided in closure 70 when open, i.e., through the opening in shutter assembly 39, between the open shutters 25 and 27 and the aperture 23 when aligned with the beam axis 15.

To block the beam 14 with maximum shielding, without line-of-sight openings ball 21 rotates around the axis x—x through spindle shafts 49 and 51 to rotate aperture 23 to a position where the aperture axis 71 is at right angles to the beam axis 15. Also, the shutters 25 and 27 move together inside sides 35 and 37 of assembly 39 until the shutters butt in a line coinciding with the beam axis 15. It will be understood, therefore, that when the shutters close they leave very small spaced voids in closure 70 on opposite sides of the normal main beam path and these voids are not in line with each other or the void provided by the aperture 23 in ball 21 when the aperture axis 71 is at right angles to the beam axis 15. Also, only one small void is present along the beam axis 15 when the closure 70 is shut, the void being only the width of the aperture 23 when it is at right angles to the beam axis 15, and only one small void is present on either side of the normal main beam path when the closure 70 is shut, these voids being produced by the closure of shutters 25 and 27. Thus the closure 70 provides maximum desired shielding throughout the whole cross-section of the beam tube 20 (not just across the normal main beam path) and no line-of-sight opening when the closure 70 is shut.

A practical arrangement for accomplishing the selective beam port closure of beams having a high density and high energy in the BNL high flux beam reactor ports is illustrated in FIGS. 2–5. Shown there is a fully portable integral closure unit 70 having a cylindrical housing 91 having end plates 93 and 95, a rotatable ball 21 and axially moveable shutters 25 and 27 actuated remotely seriatim in a simple, fool proof manner with a small rotary remote power source 81, the unit 70 being easily insertable and removeable from the confined space in a beam tube 20 having water, air and vacuum supply lines L around in inside circumference of the port. To this end the housing 91 and its end plates 93 and 95 have an outside diameter corresponding to the inside diameter of beam tube 20 and have grooves 97, 99, 100 and 101 on their outside diameter for accommodating the supply lines around the inside circumference of the beam tube 20. Bolts, such as bolts 103, hold the end plates on housing 91 so that their grooves have the proper orientation with respect to each other. The supply lines are advantageously buried in suitable solid grouting material in the collimator 19 and this blocks line of sight passages of particles through beam tube 20 along the outside of closure 70.

The cylinder 91 carries bearings 105 and 107 for the free rotation of spindles 49 and 51 therein. Suitable bearings are New Departure bearings #77–R–10 having suitable locating rings 109 for centering the axis 71 of aperture 23 on the axis 15 of beam 14. This precise location of ball 21 also permits the ball 21 to have flat sides A and B at right angles to the axis through spindles 49 and 51 and cylinder 91 is shaped on its inside to form flat surfaces C and D parallel with sides A and B of the ball 21 and closely adjacent thereto. The ball 21 is rotated in bearings 105 and 107 by spheroid ring gear 110 mounted on the side A of ball 21, and meshing worm gear 113 mounted on shaft 115, which fits into a bearing 116 in cylinder 91 and passes through a bearing 116′ in end plate 95; the shaft 115 is rotated remotely by a rotary electric motor 81 having suitable switches, speed control, clutch Z and power source O for rotating the motor first in one direction and then in the other direction as is well understood in the art. The operation of the motor thus rotates the ball 21, while pin 119 in housing 91 rides in groove 121 in ball 21 so that the pin hits one end E of the groove 121 to align the aperture axis 71 with the beam axis 15 when closure 70 is open. When closure 70 is closed, the pin 119 hits the outer end E′ of groove 121 to locate the aperture axis 71 at right angles to the beam axis 15. The shaft 115 spins in a suitable clutch Z so that when the pin 119 hits the end of groove 121 the motor 81 is protected as is well understood in the art. The use of the ball bearings 105, 107, 116 and 116′ permits the use of a low torque motor 81 and ease of rotation of ball 21.

The ball 21 also carries grooves 131 and 133 that run helically around the outside of ball 21 at an angle to each other for moving tabs 135 and 137 and the shutters 25 and 27 to which the tabs are attached when the ball 21 is rotated by shaft 115. Thus the rotation of ball 21 in one direction moves the shutters apart and the rotation of the ball 21 in the other direction moves the shutters together so that the rotating motion of shaft 115 moves the ball and shutters seriatim in a simple low torque system from a single remotely operated rotary power source. As shown in FIGS. 3 and 5 double guides 63 and 64 are on one side of shutter box 33. These guides have sleeves M and M′ thereon respectively that slide in shutter legs 161 and 162 to provide sufficient resistance to the movement of the shutters tending to cock them on the guides in response to the movement of tabs 135 and 137 in grooves 131 and 133 in ball 21.

In one operating cycle, beam port closure starts the cycle from an open position that passes beam 14 in direction 17 in collimator 41 from source 13, and then the closure 70 is closed and reopened. To this end motor 81 turns shaft 115 in a direction to turn seriatim worm gear 113, meshing ring gear 110 and ball 21 to rotate the aperture 23 and its axis 71 from alignment with the beam axis 15 to an aperture position 23' and aperture axis position 71' at right angles to the beam axis 15, at which time the pin 119 in cylinder 91 butts against the end E' of groove 121 to stop the ball rotation in this predetermined proper position. This ball rotation also pushes tabs 135 and 137 seriatim in helical grooves 131 and 133 in ball 21 to move the shutters 25 and 27 together, the shutters sliding easily on guides 61 and 63 respectively to butt surfaces 29 and 31 of the shutters while butting pin 119 against end E' of its groove 121 when the shutters butt. This quickly and completely blocks the beam 14 with little friction between the moving parts and no line of sight openings through closure 70 from the entrance end of tube 20 to the exit end thereof. The shutters close to provide shielding corresponding to the area of the apertures 23, were it filled with shielding in the normal beam path. Also, the shutters move in closing to form small voids not in line with the aperture 23.

The closure 70 then opens for the beginning of the next cycle of operation when motor 81 turns shaft 115 in the opposite direction to turn seriatim worm gear 113, ring gear 110, and ball 21 to rotate the aperture 23 and its axis 71 back into alignment with the beam axis 15. This ball rotation also pushes tabs 135 and 137 seriatim in helical slots 131 and 133 to move the shutters 25 and 27 to their open position and to butt pin 119 against end E of groove 121 to position the ball aperture sides and the shutter surfaces 29 and 31 in coincidence with the corresponding sides of beam 14 provided by collimator 19. The sides 35 and 37 of box 33 in shutter assembly 39 remain fixed during the whole cycle whereby when the closure 70 opens, these sides 35 and 37 coincide with the corresponding sides of the beam 14 provided by collimator 19 whereby the beam is transmitted in collimator 41 with substantially little or no perturbation to the particles in the beam. The cycle is then repeated as desired.

In manufacturing and assembling the embodiment, the main elements, comprise the ball 21, the shutter assembly 39, the cylindrical housing 91 and the drive shaft 115. The ball is made in one piece of heavy shielding material. One suitable material is the Heavimet brand of cobalt containing steel. The housing 91 comprises substantially one heavy solid piece of 303 stainless steel but Heavimet may be used therefor with cut out portions minimized. For ease of assembly selectively removable pieces P may be cut in the sides of housing 91 to accommodate bearings 105 and 107 and to form end plates 93 and 95 which are bolted on the ends thereof with suitable bolts 103 and 152. Suitably dowels D', such as those shown in the drawings are also employed. The cylinder 91, also has a cut out portion K on one side, which is substantially filled by ball 21, and this cut out portion has a matting surface corresponding to the ball outside shape for maintaining the close clearance between the ball and housing 91. The shaft 115, also comprises substantially one piece but, for ease of assembly, the shaft may be cut and connected with a suitable set screw coupling collar 151, such as is understood in the art.

The shutter assembly, comprises shutters 25 and 27, guides 61 and 63 and a box 33 inside extending portions 91' of cylinder 91. Cut out portions K', like cut out K of cylinder 91, form mating surfaces that closely correspond with the outside shape of ball 21 for maintaining a very small tolerance between the ball and box 33. The end plate 95 bolts over this box at one end of cylinder 91 with bolts 152. The sides 35 and 37 inside the box 33 are machined from the one end so that these sides are an integral part of the box 33 corresponding to the shape and direction of two sides of the beam 14 transmitted by collimator 19 and aperture 23. The sides also form grooves 153 and 154 in which guides 61, 63 and 64 are located. Advantageously, these guides are inserted through holes in the outside of box 33. The shutters, which slide on these guides, advantageously have an outer shell S forming tabs 135 and 137 respectively and having grooves G and G' that accommodate the sides 35 and 37 respectively of box 33. The shutters form legs 161 and 161' on shutter 25 and legs 162 and 162' on shutter 27 that fit into the respective grooves 153 and 154 in box 33, and fit over the ends of sides 35 and 37. The guide 61 slides in legs 161' and 162' and the guides 63 and 64 and their sleeves M and M' slide in legs 161 and 162 of shutters 25 and 27. Advantageously, the shutter shells have heavy shielding inserts. Suitable inserts comprise Heavimet brand cobalt containing shielding metal.

The closure 70 is removed simply by removing cylinder 91, its contents and allied parts being removed thereby. To this end a hooked instrument is inserted in collimator 41 against the back of ball 21 when its axis 71 is turned slightly from the beam axis 15 and pulled to pull the closure 70 from beam tube 20. A new closure 70 is then inserted in beam tube 70 while the old radioactive closure is disposed of, e.g., by burying.

The beam port closure of this invention has the advantage of providing maximum beam shielding and maximum beam opening area in a given port size while providing a continuous collimator for transmitting the beam substantially without perturbations. Additionally, this invention provides a simple, compact, portable unit having a rotatable ball and slideable shutters that are remotely operated seriatim from a simple rotary power source with precise alignment for insertion and removal into and out of existing cylindrical beam tubes having given collimator dimensions and supply lines. Moreover, the beam port closure of this invention is operable to block and collimate a beam having a density of up to $10^{15}$ neutrons/cm.$^2$/sec. or over having an energy of up to 10 mev. or over with no line of sight openings and substantially few in line voids in portions where shielding is desired.

It is understood that the end plates 93 and 95 form openings 201 and 202. Opening 202 corresponds to the cross-sectional area of the opening of shutter box 33 when open, aperture 23 and the inside of collimator 19. The opening 201 receives the outside of collimator 19 so that its end fits closely adjacent ball 21.

What is claimed is:

1. A beam port closure for a high density, high energy particle beam, comprising a rotatable ball having an aperture corresponding to the beam size and shape, shutters having means forming a box opening adjacent said ball aperture corresponding to the beam size and shape, said ball forming helical grooves and said shutters having tabs slidably engaged with said ball in said grooves whereby the rotation of said ball moves said shutters seriatim, and means for rotating said ball aperture and moving said shutters at right angles to the beam axis for aligning said aperture and box for opening said port for receiving and transmitting said beam substantially without large perturbations, and rotating said aperture and closing said shutters for closing said port to provide maximum shielding for said beam substantially without in line openings or in line voids between said shutters and said aperture in said beam path when said port is closed.

2. A beam port closure for a high density, high energy particle beam, comprising a beam source for providing a beam density at $10^{14}$ to $10^{15}$ neutrons/cm.$^2$/sec. at an energy up to over 10 mev.; a beam tube for receiving and transmitting said beam in a uniform square cross-section, and a portable beam port closure insertable in said tube in alignment with said uniform cross-section, comprising a rotatable ball having an aperture therethrough corresponding with said uniform cross-section, a ring gear on one side thereof and forming helical grooves on the outside thereof, means having shutters forming a box opening adjacent said aperture corresponding with said uniform cross-section, said shutters having tabs slideably engageable with said ball in said helical grooves, rotary remote driving means for rotating said ring gear, ball and moving said shutters seriatim, and means responsive to said rotation for aligning said box and aperture with said beam cross-section to collimate said beam, and for stopping said aperture rotation in a position at right angles to said beam while butting said shutters to block said beam.

References Cited

UNITED STATES PATENTS

| | | | |
|---|---|---|---|
| 3,238,371 | 3/1966 | Furnas | 250—105 |
| 3,259,747 | 7/1966 | Ziegler | 250—65 |
| 3,275,831 | 9/1966 | Martin | 250—105 |

RALPH G. NILSON, *Primary Examiner.*

S. ELBAUM, *Assistant Examiner.*